United States Patent
Ni et al.

(10) Patent No.: US 8,055,983 B2
(45) Date of Patent: Nov. 8, 2011

(54) DATA WRITING METHOD FOR FLASH MEMORY AND ERROR CORRECTION ENCODING/DECODING METHOD THEREOF

(75) Inventors: Jian Qiang Ni, Hsinchu (TW); Dong Yu He, Hsinchu (TW); Chun Ting Liao, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 838 days.

(21) Appl. No.: 12/126,344

(22) Filed: May 23, 2008

(65) Prior Publication Data

US 2008/0294965 A1 Nov. 27, 2008

(30) Foreign Application Priority Data

May 24, 2007 (TW) .............................. 96118623 A

(51) Int. Cl.
*H03M 13/00* (2006.01)
(52) U.S. Cl. ........................... 714/784; 714/781
(58) Field of Classification Search .................. 714/784, 714/781
See application file for complete search history.

(56) References Cited

U.S. PATENT DOCUMENTS

| | | | |
|---|---|---|---|
| 5,136,592 A | 8/1992 | Weng | |
| 5,996,111 A * | 11/1999 | Yoshida et al. | 714/784 |
| 6,038,452 A * | 3/2000 | Strawczynski et al. | 455/446 |
| 6,252,961 B1 | 6/2001 | Hogan | |
| 6,771,929 B1 * | 8/2004 | Nivens et al. | 455/13.4 |
| 2004/0117688 A1 * | 6/2004 | Vainsencher et al. | 714/42 |
| 2006/0107130 A1 | 5/2006 | Baker et al. | |
| 2006/0248434 A1 | 11/2006 | Radke et al. | |

OTHER PUBLICATIONS

Taiwan Office Action mailed May 25, 2010, no translation; considered only US references listed on p. 8.

* cited by examiner

*Primary Examiner* — M. Mujtaba K Chaudry
(74) *Attorney, Agent, or Firm* — Thomas, Kayden, Horstemeyer & Risley, LLP

(57) ABSTRACT

A data writing method for flash memory and an error correction encoding/decoding method thereof are disclosed. In an embodiment of the data writing method, a 6-bit ECC scheme using a Reed-Solomon code derived from a Galois Field GF($2^9$) is used to encode a data for generating a redundant which requires smaller storing space. In an embodiment of the error correction encoding/decoding method, an erase checking value corresponding to the status where all the bytes of data area and parameter storing area are "0xff" is provided to improve the security of stored data.

6 Claims, 7 Drawing Sheets

DATA WRITING METHOD FOR FLASH MEMORY AND ERROR CORRECTION ENCODING/DECODING METHOD THEREOF

FIELD OF THE INVENTION

The invention relates to flash memory, and more particularly, to a data writing method for flash memory and error correction encoding/decoding method thereof.

BACKGROUND OF THE INVENTION

The flash memory is a very popular data storage apparatus at present. But the bit of the data may be erroneous caused by the problem of the occasional electrical noise or the random, non-repetitive erroneous occurrence of bit 0 or bit 1 stored in memory cell resulted from the limited access speed of flash memory due to the nature of its material. To ensure the correctness of the data stored in the logic memory cell, the error correcting code composed of bits is inserted into the data as a checking code for locating the error bit and correcting it. This data protecting scheme is called ECC checking.

Referring to FIG. 1A for the schematic view of the data structure of the flash memory in accordance with the conventional art, the flash memory 1 includes several blocks 11, and each block 11 includes several pages 12. Each page at least includes one sector 13, or mini-page, and each sector 13 at least includes a data area 131 and a spare area 132. Because the minimum transmission unit of the typical Integrated Device Electronic interface (IDE-ATA) is 512 bytes, the space of the storage area is generally 512 bytes and the space of the spare area is 16 bytes.

Referring to FIG. 1B for the schematic view of the data structure of the spare area 132 in accordance with the conventional art, the spare area 132 includes a bad memory information 141, an ECC checking information 142, a logic block address (LBA) information 143, a split block logic sector address (SBLSA) information 144, and a redundant code 145 of the ECC. The redundant code 145 is derived from the data encoded by using the ECC.

There are generally two types of ECC, which can be used as mentioned above: one is Block Code and the other is Convolution Code. The Block Code divides the data into several fixed blocks for transmission and its encoding methodology is by adding redundant code onto the original data. At the decoding end the error correction of the received data is performed based on the redundant code. The coding schemes most often used in block code are Reed-Solomon Code and Bose Chaudhuri Hocquengham code (BCH). The encoding/decoding of the Reed-Solomon Code is in a finite field ($2^m$) where m is a positive integer. The finite field is also called Galois Field. The Reed-Solomon encoding/decoding technique is well known by the person in this field, and for the sake of brevity, detail discussion is omitted.

When in the flash memory data was encoded with the 4-bit ECC using the Reed-Solomon code derived from the Galois Field GF ($2^{10}$), to generate the redundant code, the space for storing the redundant code is 80 bits (10 bytes), i.e., 80=2×4×10. Therefore, as illustrated in spare area 132 of FIG. 1B, 10 bytes are reserved for redundant code 145 and the other 6 bytes are for other information, such as bad memory information 141. The storing space of the bad memory information 141, including bad block information and bad page information, is 1 byte. The bad block information is for indicating whether the block is damaged and the bad page information is for indicating whether the page is damaged. The storing space of the ECC checking information 142 is 1 byte for indicating whether the ECC checking should be executed. The storing space of the logic block address information 143 is 2 bytes, and the storing space of the split block logic sector address information 144 is 2 bytes.

As the data protection mechanism becomes more and more important, using more bits for error correcting encoding/decoding becomes a design trend of flash memory. However, When higher-bit schemes, e.g., the 6-bit ECC using the Reed-Solomon code derived from the Galois Field GF ($2^{10}$), are used to encode the data, the storing space required for the redundant code reaches 120 bit (or 15 byes), i.e., 120=2×6×10, and it becomes too much to be stored in the data structure illustrated in FIG. 1B. Although the manufacturer usually provides extra storing spaces in each flash memory based on the conventional data structure, but these extra storing spaces are fixed, limited and cannot be expanded. Therefore, what is needed is to dispose the data structure with higher space use efficiency in a limited space of the flash memory.

In the conventional art, the ECC checking information 142 is for indicating whether the current sector has been written or erased. However, the ECC checking information 142 needs an extra space, and the bit storing the ECC checking information 142 may be erroneous and results in erroneous judgment during decoding process. How to prevent the problem mentioned above becomes essential.

SUMMARY OF THE INVENTION

Therefore, it is one of objectives of the present invention to provide a data writing method and an error correction encoding/decoding method for a flash memory, so as to provide a better data protecting mechanism for the flash memory having limited space.

In an embodiment of the present invention, a data writing method is provided to write a data into a sector of a block in a flash memory. The block includes several sectors, and the data includes several bytes and each byte includes 8 bits. The method includes the following steps of:

obtaining a logic block address information and a bad memory information of the block;

reorganizing the data into a plurality of encoding groups, wherein each encoding group contains 9 bits;

using a 6-bit ECC scheme to encode these encoding groups to generate a redundant code, wherein the 6-bit ECC scheme use a Reed-Solomon code derived from the Galois Field GF ($2^9$);

storing the data, the logic block address information, the bad memory information and the redundant code in the sector.

The invention improves the security of the data by increasing the bit number of the ECC scheme, and further decreases the complexity of the encoding/decoding of the Reed-Solomon code so that the storing space of the redundant code can reduced and stored in the limited space of conventional flash memory.

In an embodiment of the present invention, an error correction encoding method is provided to encode the data stored in a sector of a block of a flash memory. The sector includes a data area, a parameter storing area and a redundant code storing area. The error correction encoding method includes the steps of:

providing an erase checking value corresponding to the status where all the bytes in the data area and the parameter storing area are "0xff";

obtaining a data which is desired to be stored in the data area, and encoding the data by an ECC scheme to generate a second redundant code;

executing a logic XOR operation on the second redundant code and the erase checking value to generate a third redundant code;

storing the data and the third redundant code in the data area and the redundant code storing area respectively.

Moreover, in an embodiment of the present invention, an error correction encoding method is provided to decode the data stored in a sector of a block of a flash memory. The sector includes a data area for storing a data, a parameter storing area and a redundant code storing area for storing a first redundant code. The error correction encoding method includes the steps of:

providing an erase checking value corresponding to a status where all the bytes in said data area and said parameter storing area are "0xff";

executing a logic XOR operation upon the first redundant code and the erase checking value to generate a third redundant code;

executing an error correction decoding process with the data based on the third redundant code.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENTS

The present invention relates to a data writing method for flash memory and error correction encoding/decoding method thereof. While the specifications describes several example embodiments of the invention, it should be understood that the invention can be implemented in many way and is not limited to the particular examples described below or to the particular manner in which any features of such examples are implemented.

Figure 1A:
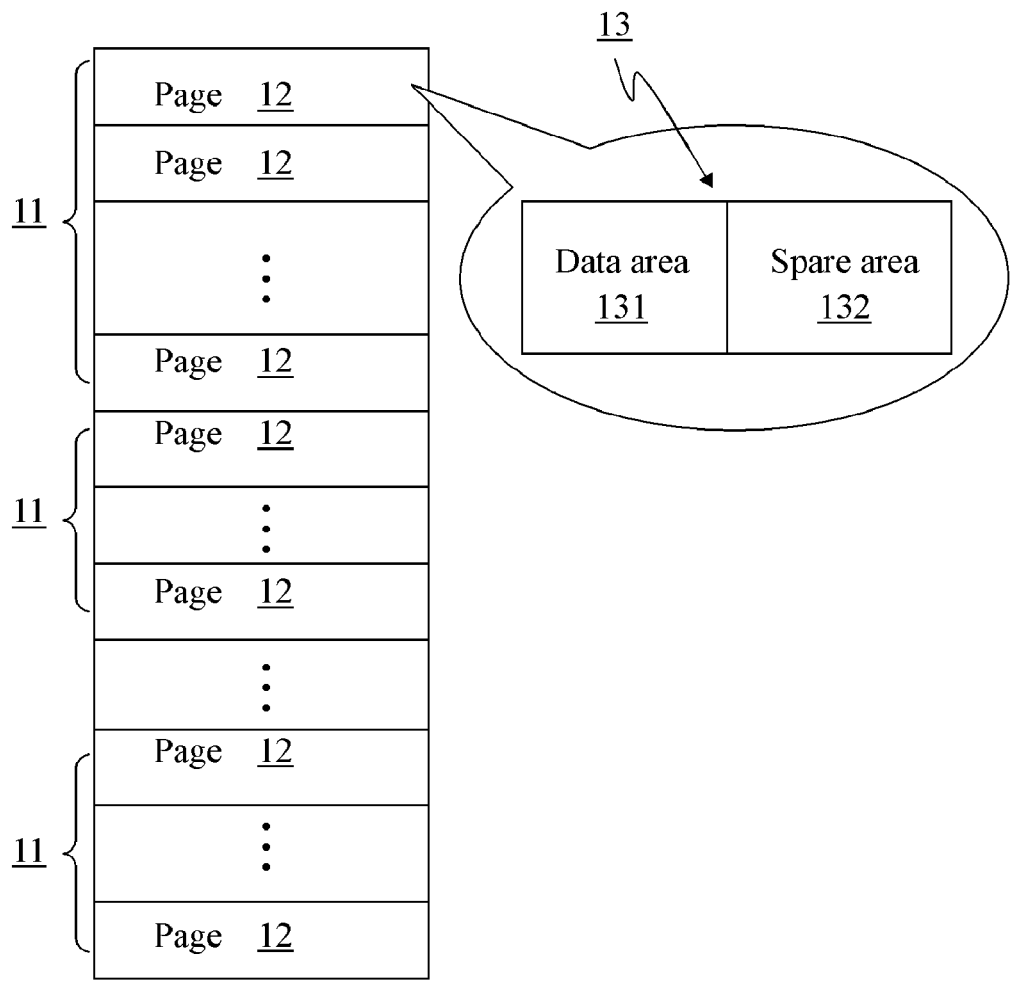
FIG. 1A illustrates a schematic view of the data structure of flash memory in accordance with the conventional art.
Figure 1B:
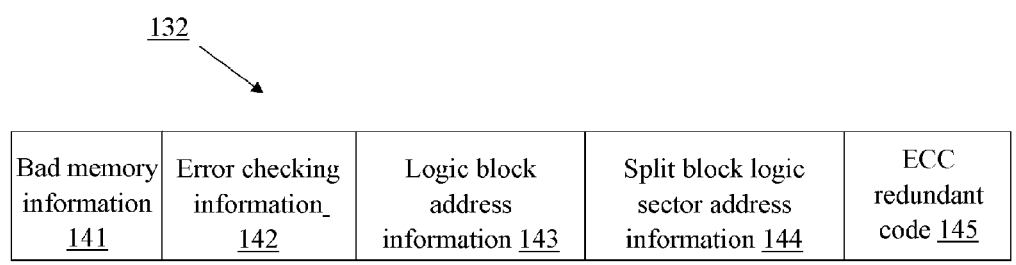
FIG. 1B illustrates a schematic view of the data structure of the spare area in accordance with the conventional art.
Figure 2:
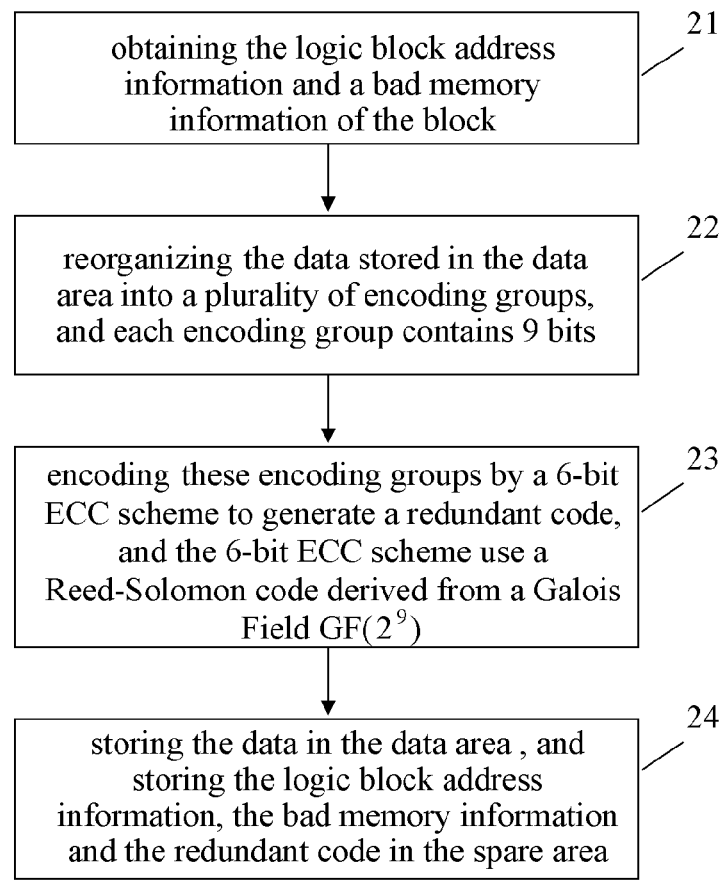
FIG. 2 is a flow diagram of an embodiment of the data writing method of the present invention.
Figure 3:
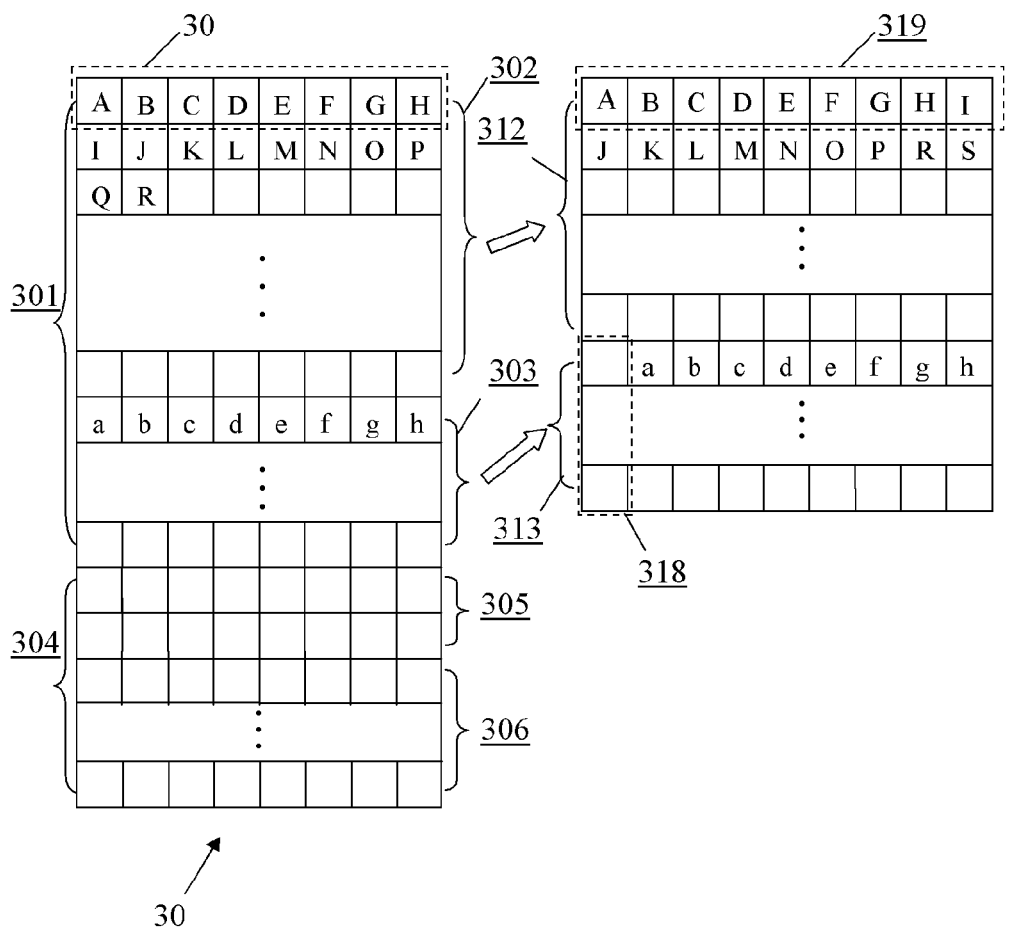
FIG. 3 is a schematic view of an embodiment of the data structure in a sector of a flash memory in accordance with the present invention.

Referring to FIG. 2 for a flow diagram of an embodiment of the data writing method in accordance with the present invention, and to FIG. 3 for a schematic view of an embodiment of the data structure in a sector of a flash memory in accordance with the present invention, the data writing method is applied to write data into a sector of a block of the flash memory. As illustrated in FIG. 3, sector 30 includes a data area 301 and a spare area 304. The storing space of the data area 301 is 512 bytes, and the storing space of the spare area 304 is 16 bytes, and each data byte 309 contains 8 bits. The data writing method includes following steps of:

Step 21: obtaining the logic block address information and bad memory information of the block containing the sector.

Step 22: reorganizing the data stored in the data area 301 into a plurality of encoding groups 319, wherein each encoding group 319 contains 9 bits. As illustrated by the data 312 in FIG. 3, the former 504 bytes data are reorganized into 448 encoding groups. As illustrated by the data 313 in FIG. 3, a bit with value 1 is appended to the most significant bit 318 of each of the remaining 8 data bytes 303 of the data area 301, to form 8 encoding groups.

Step 23: encoding the encoding groups of the data 312 and of the data 313 with a 6-bit ECC scheme to generate a redundant code, wherein the 6-bit ECC scheme uses a Reed-Solomon code derived from a Galois Field $GF(2^9)$ and the storing space required by the redundant code is 108 bits, i.e., $108=2\times6\times9$.

Step 24: storing the data in the data area 301, and storing the logic block address information, the bad memory information, and the redundant code in the spare area 303.

In this embodiment, the spare area 303 contains the parameter storing area 305 and the redundant code storing area 306. The space of the parameter storing area 305 is 2 bytes, and the space of the redundant code storing area 306 is 14 bytes. The redundant code storing area 306 is for storing the redundant code. In the parameter storing area 305, 10 bits are for storing the logic block address information, 5 bits are for storing the bad memory information, and 1 bit is for storing the split block logic sector address information or other information.

Besides, for enhancing the security of the data, in the step 22 of reorganizing the reorganizing can be performed upon the data stored in the data area 301 together with the data stored in the parameter storing area 305. And in the step 23 of encoding the data 312, the data 313, and the data stored in the parameter storing area 305 can be encoded together.

When the sector of the flash memory is decoded, the sector storing data may reside in one of the following three statuses:

(1). There is data written in this sector, and the data can be successfully decoded and correctly read.

(2). There is data written in this sector, but the data cannot be successfully decoded and/or successfully read.

(3). The sector is an erased sector, and there is no data written in this sector.

Because the value stored in the erased memory will be all "0xff", if the ECC is applied to decode data which stores all "0xff", the decoding error will occur and result in erroneous judgment of the status (2) and the status (3). When the sector is determined to be in the status (2), the system will recognize this sector as a bad sector and will not use this sector again. Under the situation that there is no extra space to store data for labeling the status (2) or the status (3), the present invention provides an error correction encoding method, to save the storage of extra labeling data and to prevent the erroneous judgment of the status (2) and the status (3).

Figure 4A:
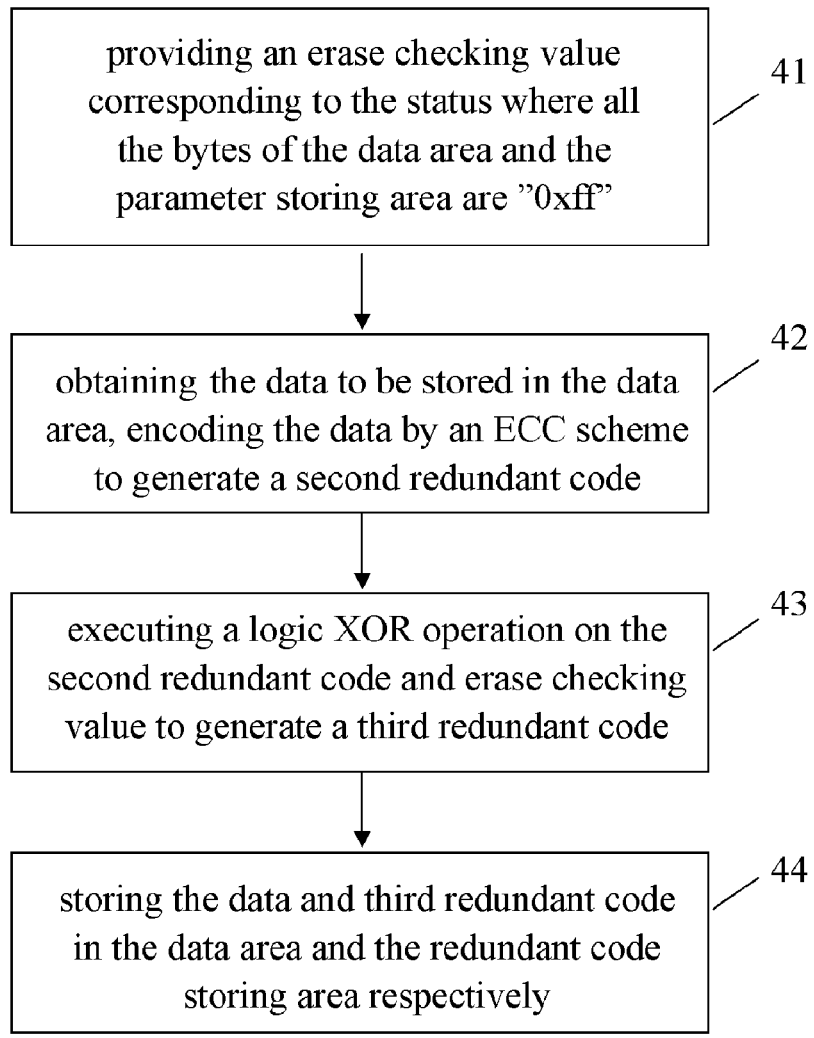
FIG. 4A is a flow diagram of an embodiment of the error correction encoding method in accordance with the present invention.

Referring to FIG. 4A for a flow diagram of an embodiment of the error correction encoding method in accordance with the present invention, the method is applied to encode the data stored in a sector of a block of a flash memory. As illustrated in FIG. 3, the sector includes a data area 301, a parameter storing area 305, and a redundant code storing area 306. The method includes the following steps of:

Step 41: providing an erase checking value, corresponding to the status where all the bytes in the data area and the parameter storing area are "0xff".

Step 42: obtaining the data to be stored in the data area 301, and encoding the data by the aforementioned ECC scheme, to generate a second redundant code.

Step 43: executing a logic XOR operation on the second redundant code and the erase checking value, to generate a third redundant code.

Step 44: storing the data and the third redundant code in the data area 301 and the redundant code storing area 306, respectively.

Figure 4B:
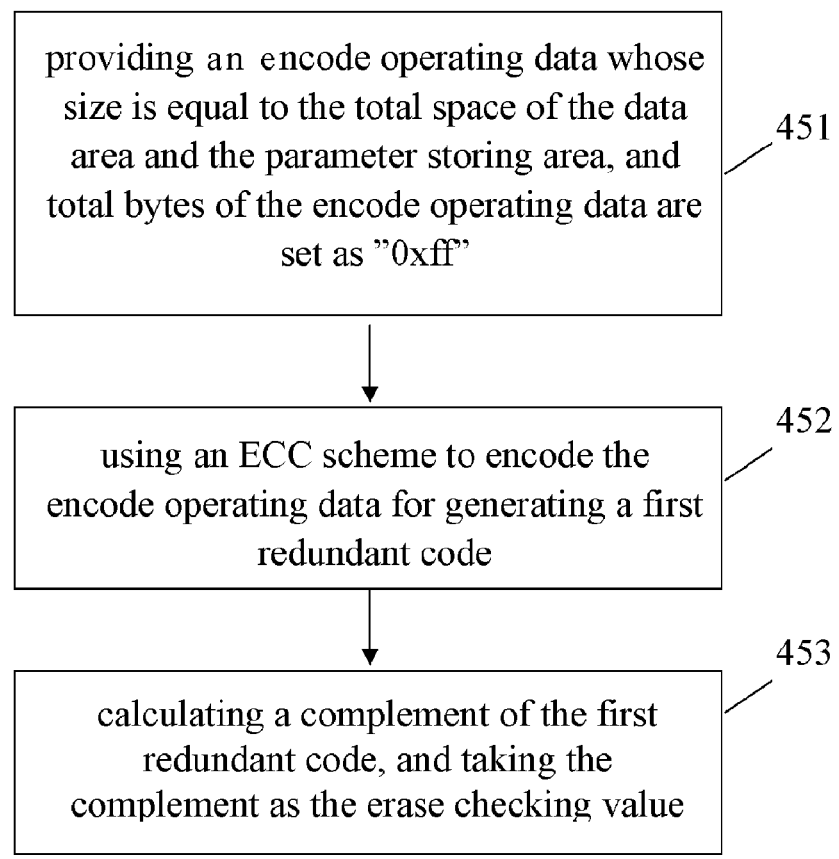
FIG. 4B is a flow diagram of an embodiment of the method of calculating the erase checking data in accordance with the present invention.

Referring to FIG. 4B for a flow diagram of method of calculating the erase checking value in accordance with the present invention, the method corresponds to FIG. 3. The method includes the following steps of:

Step 451: providing an encode operating data with a plurality of bytes, whose size is equal to the total space of the data area 301 and the parameter storing area 305, and setting all those bytes of the encode operating data as "0xff".

Step 452: using aforementioned ECC scheme to encode the encode operating data for generating a first redundant code.

Step 453: calculating a complement of the first redundant code, and taking the complement as the erase checking value.

In this method, the erase checking value only corresponds to the ECC code, and the storing space of the data area and of the parameter storing area. Therefore, if these conditions remain unchanged, the erase checking value can be calculated in advance, and the erase checking value can be applied when every time executing the error correction encoding method. But if these conditions vary, the step 451 through step 453 should be executed to calculate the erase checking value when every time the error correction encoding method is executed.

When data is to be read from a block of the flash memory, the error correction decoding process should be first executed to make sure the correctness of the data in the block. If the block is an erased block, the data stored within is "0xff"; at this time if the error correction decoding process is executed upon said data, the decoding process will fail, which will result in the erroneous judgment of status (2) or status (3) mentioned above. The following method is provided by the present invention to prevent this situation mentioned above.

Figure 5:
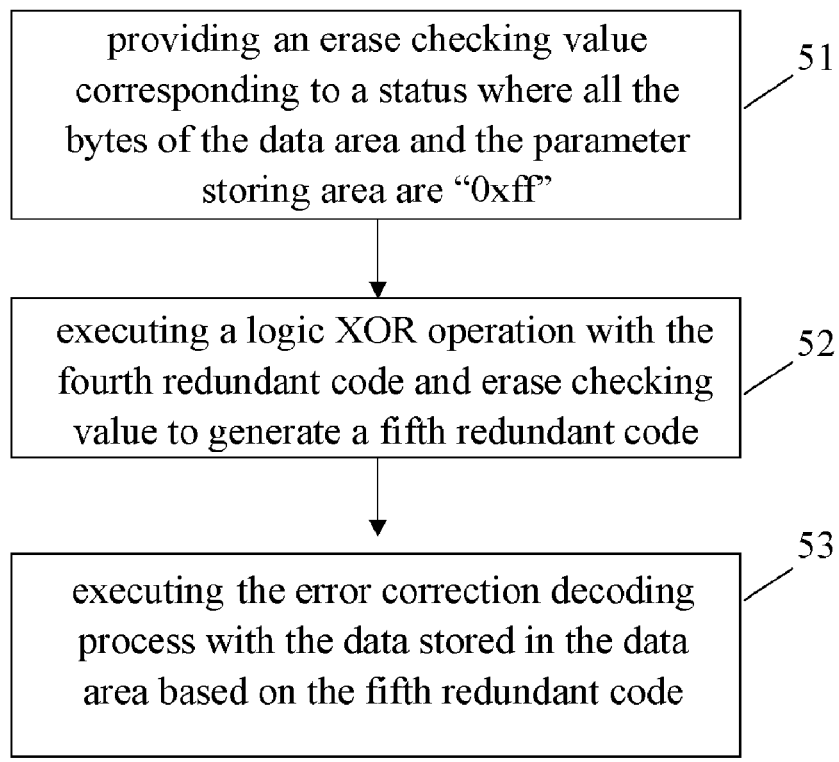
FIG. 5 is a flow diagram of an embodiment of the error correction decoding method in accordance with the present invention.

Referring to FIG. 5 for a flow diagram of an embodiment of the error correction decoding method in accordance with the present invention, the method is applied for decoding the data stored in a sector of a block of a flash memory. As illustrated in FIG. 3, the sector 3 includes a data area 301 for storing data, a parameter storing area 305, and a redundant code storing area 306 for storing a fourth redundant code. The method includes the following steps of:

Step 51: providing an erase checking value corresponding to a status where all the bytes in the data area 301 and the parameter storing area 305 are "0xff".

Step 52: executing a logic XOR operation upon the fourth redundant code and the erase checking value, to generate a fifth redundant code.

Step 53: executing the error correction decoding process with the data stored in the data area 301 based on the fifth redundant code.

The erase checking value could be calculated by using the method illustrated in FIG. 4B. In this method, the erase checking value only corresponds to the ECC and the storing space of the data area and of the parameter storing area. Therefore, if these conditions remain unchanged, the erase checking value can be calculated in advance, and the erase checking value can be applied for executing the error correction encoding method. But if these conditions vary, the step 451 through step 453 should be executed to calculate the erase checking value when every time the error correction encoding method is executed.

In the decoding process mentioned above, if data stored in both the data area 301 and the parameter storing area 305 are genuine encoded data and redundant code derived from the encoding process of the encoded data, because the data has been performed the logic XOR operation with the erase checking value during encoding, the origin encoded data and the origin redundant code can be restored after the logic XOR operation is again executed in step 52. As such, the origin encoded data and the origin redundant code can be applied to finish the error correction decoding process in step 53.

While decoding, if the data value stored in the data area 301 and in the parameter storing area 305 are all "0xff", after the process of step 52 the processed data in the data area 301 and the parameter storing area 305 can be applied to finish the error correction process. At this time the decoded data are all "0xff", which indicates that the sector is an erased sector. By the error correction encoding method mentioned above, the parameter storing area 305 does not need to reserve a space for storing the error checking code. Preferably, the flash memory could be Multi Level Cell or Single Level Cell.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data writing method applied for writing a data into a sector of a block of a flash memory, and said data including a plurality of bytes, and each byte including 8 bits, and said data writing method including the steps of: obtaining a bad memory information and a logic block address information of said block;

reorganizing said data into a plurality of encoding groups, and each encoding group including 9 bits;

encoding said encoding groups by a 6-bit error correcting code (ECC) scheme to generate a redundant code, and said 6-bit ECC scheme using a Reed-Solomon code derived from a Galois Field $GF(2^9)$; and storing said data, said logic block address information, said bad memory information and said redundant code in said sector.

2. The data writing method of claim 1, wherein said flash memory is either Multi Level Cell (MLC) or Single Level Cell (SLC).

3. The data writing method of claim 1, wherein said data includes 512 data bytes.

4. The data writing method of claim 3, wherein said step of reorganizing further includes a step of dividing first 504 data bytes of said data into 448 encoding groups, and adding one bit in the other 8 data bytes of said data respectively to form 8 encoding groups, and the value of said added bit is 1.

5. The data writing method of claim 4, wherein said step of reorganizing further includes a step of reorganizing said logic block address information, said bad memory information and said data together.

6. The data writing method of claim 1, wherein the space for storing said redundant code is 108 bits.

* * * * *